United States Patent
Ferrer et al.

(10) Patent No.: US 10,183,451 B2
(45) Date of Patent: Jan. 22, 2019

(54) METHOD FOR REPAIRING A COMPOSITE-MATERIAL PANEL OF AN AIRCRAFT AND TOOL FOR IMPLEMENTING SAID METHOD

(71) Applicants: Airbus SAS, Blagnac (FR); Airbus Operations SAS, Toulouse (FR)

(72) Inventors: Guillaume Ferrer, Toulouse (FR); Thierry Borja, Pibrac (FR); Julien Charles, Toulouse (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 249 days.

(21) Appl. No.: 15/216,914

(22) Filed: Jul. 22, 2016

(65) Prior Publication Data

US 2017/0028655 A1    Feb. 2, 2017

(30) Foreign Application Priority Data

Jul. 27, 2015    (FR) ...................................... 15 57122

(51) Int. Cl.
| | |
|---|---|
| *B29C 73/08* | (2006.01) |
| *B29C 73/06* | (2006.01) |
| *B29C 73/12* | (2006.01) |
| *B29C 73/30* | (2006.01) |
| *B29L 31/30* | (2006.01) |

(52) U.S. Cl.
CPC .............. *B29C 73/08* (2013.01); *B29C 73/06* (2013.01); *B29C 73/12* (2013.01); *B29C 73/30* (2013.01); *B29L 2031/3076* (2013.01)

(58) Field of Classification Search
None
See application file for complete search history.

(56) References Cited

U.S. PATENT DOCUMENTS

| | | |
|---|---|---|
| 2009/0095840 A1 | 4/2009 | Roux et al. |
| 2011/0067359 A1 | 3/2011 | Kulesha |
| 2011/0146906 A1 | 6/2011 | Anderson et al. |
| 2012/0080135 A1 | 4/2012 | Evans et al. |
| 2014/0290851 A1 | 10/2014 | Takagi et al. |
| 2015/0001768 A1 | 1/2015 | Kia et al. |
| 2015/0151498 A1 | 6/2015 | Witte |

FOREIGN PATENT DOCUMENTS

| | | |
|---|---|---|
| EP | 2881246 | 6/2015 |
| FR | 2239354 | 2/1975 |
| FR | 2901246 | 11/2007 |
| FR | 2999974 | 6/2014 |
| GB | 610734 | 10/1948 |

OTHER PUBLICATIONS

French Search Report, dated Jun. 15, 2016, priority document.

*Primary Examiner* — Monica A Huson
(74) *Attorney, Agent, or Firm* — Green, Burns & Crain, Ltd.

(57) ABSTRACT

A method and a tool for repairing a composite-material panel of an aircraft with at least one repair part made of composite material without using an autoclave. The repair method includes the steps of preparing the panel, placing at least one repair part made of composite material on the second face to cover a damaged zone, positioning a vacuum bag configured to sealingly cover the repair part, polymerizing or consolidating the repair part, compressing the vacuum bag against the repair part using a compression plate concomitantly with the step in which the repair part is polymerized or consolidated.

9 Claims, 2 Drawing Sheets

METHOD FOR REPAIRING A COMPOSITE-MATERIAL PANEL OF AN AIRCRAFT AND TOOL FOR IMPLEMENTING SAID METHOD

CROSS-REFERENCES TO RELATED APPLICATIONS

This application claims the benefit of the French patent application No. 15 57122 filed on Jul. 27, 2015, the entire disclosures of which are incorporated herein by way of reference.

BACKGROUND OF THE INVENTION

The present invention relates to a method for repairing a composite-material panel of an aircraft, as well as a tool for implementing the method.

An aircraft includes numerous panels made of composite material. For example, the fuselage and the wing system of an aircraft are made up of juxtaposed panels of composite material forming the outer envelope of the aircraft.

During operation of an aircraft, some composite-material panels may become damaged, for example following an impact, and need to be repaired.

Document FR 2901246 describes a first operating mode for repairing a damaged fuselage zone comprising the steps of cutting out at least one section from the fuselage to form an opening encompassing the damaged zone and attaching, using attachment elements such as bolts or rivets, a portion of sheet metal compatible with the rest of the fuselage to close the opening.

This first operating mode is not fully satisfactory since the attachment elements remain visible and have a negative visual appearance.

According to a second operating mode intended to overcome the aforementioned drawbacks, a repair method comprises steps involving applying plies of fibers pre-impregnated with resin to the damaged zone, and covering the different plies using a tool that comprises different layers covered by a bladder or a vacuum bag.

The tool also includes a vacuum system designed to aspirate the gases present in the volume delimited by the panel and the vacuum bag. To ensure the polymerization or consolidation of the plies of fibers pre-impregnated with resin, and the adhesion of same to the rest of the panel, the panel and the tool are placed in an autoclave where the fiber plies are subjected to temperature and pressure cycles.

This second operating mode results in a near-invisible repair. However, it can only be used if the panel is removable and can be placed in an autoclave. Consequently, this second operating mode cannot be used to repair panels on the fuselage or wing system of an aircraft.

Document U.S. 2011/0067359 proposes a method for consolidating or polymerizing a composite-material panel without using an autoclave. According to this method, as illustrated in FIG. 1, a group of fiber plies 10 pre-impregnated with resin is positioned on a supporting part 12 and covered by a tool that includes different layers (not shown), a heating cover 14 and two vacuum bags: an inner vacuum bag 16 that covers the group of fiber plies 10 and an outer vacuum bag 18 that covers the inner vacuum bag 16. The inner and outer vacuum bags 16, 18 are joined sealingly to the supporting part 12 by sealing means 20 and 22.

This method can be used to repair a panel on a fuselage or a wing system of an aircraft on site. Consequently, during polymerization or consolidation of the fiber plies, the heating cover 14 makes it possible to generate the temperature cycle, and the pressurized gas injection between the two vacuum bags enables the inner vacuum bag 16 to exert a pressure on the pre-impregnated fiber plies if the atmospheric pressure exerts a pressure on the outer vacuum bag 18 that exceeds a given threshold.

In a variant of this method, a single vacuum bag is used, covering all of the fiber plies and a vacuum system enabling the gases present in the volume delimited by the vacuum bag to be removed. The atmospheric pressure then exerts a pressure on the vacuum bag that enables polymerization of the fibers under good conditions.

These repair methods cannot be used in certain circumstances where atmospheric pressure is not sufficient, for example when performing a repair at altitude.

SUMMARY OF THE INVENTION

The present invention is intended to overcome the drawbacks in the prior art by proposing a repair method that can be used on site and that is not subject to the vagaries of atmospheric pressure.

For this purpose, the invention relates to a method for repairing a composite-material panel of an aircraft, the panel having a first face and a second face that has a damaged zone, the repair method comprising the following steps:

preparation of the panel, placement of at least one repair part made of composite material on the second face to cover the damaged zone, positioning of a vacuum bag designed to sealingly cover the repair part, polymerization or consolidation of the repair part.

According to a first variant of the invention, the repair method is characterized in that it includes a step in which the vacuum bag is compressed against the repair part using a compression plate concomitantly with the step in which the repair part is polymerized or consolidated by strapping at least one strap around the panel, the compression plate being positioned between the strap or straps and the panel, and adjusting the tension of each strap to adjust the compressive force exerted by the compression plate on the repair part.

Preferably, the compressive force is measured and the tension of each strap is adjusted as a function of the compressive force measured.

According to a second variant, the repair method is characterized in that it includes a step in which the vacuum bag is compressed against the repair part using a compression plate concomitantly with the step in which the repair part is polymerized or consolidated, the compression plate being made of ferromagnetic material, and in that at least one magnet is positioned against the first face of the panel such as to attract the compression plate toward the panel.

According to a third variant, the repair method is characterized in that it includes a step in which the vacuum bag is compressed against the repair part using a compression plate concomitantly with the step in which the repair part is polymerized or consolidated, a first set of magnets being positioned against the first face of the panel, a second set of magnets being positioned such that the compression plate is arranged between the first set of magnets and the second set of magnets, the magnets in the second set attracted by the magnets in the first set exerting a force on the compression plate that tends to move the plate toward the panel.

Regardless of the variant, the fact of compressing the vacuum bag against the repair part makes it possible to compress this latter against the panel, thereby preventing the appearance of faults in the repair part and/or in the joining zone between the repair part and the panel. Furthermore, this method can be implemented on site, without using an autoclave, regardless of atmospheric pressure, and without having to cut the panel to be repaired. The fact that this compression is achieved by bearing against the aircraft itself, and not against atmospheric pressure as in the prior art, makes it possible to apply more pressure, even when atmospheric pressure is low.

The invention also relates to a tool for implementing the method for repairing a panel with a repair part, the tool comprising:

a vacuum bag that is designed to cover the repair part and that has a peripheral edge designed to be connected sealingly to the panel, a vacuum system designed to remove the gases present in the volume delimited by the vacuum bag and the panel, a heating cover.

According to a first variant, the tool is characterized in that it includes a compression plate designed to cover the vacuum bag and at least one compression means designed to act on the compression plate such that the plate applies a compressive force on the repair part, the compression means comprising at least one strap designed to surround the panel and a system for adjusting the tension of each strap.

According to other features, the tool includes:

at least one sensor designed to measure a compressive force exerted by the compression plate on the repair part, a control system designed to control the tension adjustment system using information provided by the sensor.

According to a second variant, the tool is characterized in that it includes a compression plate designed to cover the vacuum bag and at least one compression means designed to act on the compression plate such that the plate applies a compressive force on the repair part, the compression plate being made of ferromagnetic material, the compression means comprising at least one magnet designed to attract the compression plate toward the panel.

According to a third variant, the tool is characterized in that it includes a compression plate designed to cover the vacuum bag and at least one compression means designed to act on the compression plate such that the plate applies a compressive force on the repair part, the compression means comprising a first set of magnets and a second set of magnets positioned such that the panel and the compression plate are positioned between the first and second sets of magnets and that the magnets in the second set are attracted by the magnets in the first set and exert a force on the compression plate tending to move the plate toward the panel.

BRIEF DESCRIPTION OF THE DRAWINGS

Other features and advantages are set out in the description of the invention below, given purely by way of example and with reference to the attached drawings, in which.

DETAILED DESCRIPTION OF THE PREFERRED EMBODIMENTS

Figure 1:
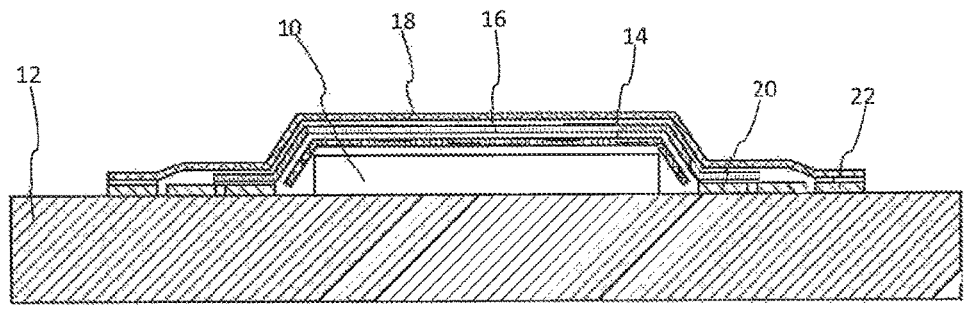
FIG. 1 is a schematic cross section of a tool for polymerizing or consolidating a composite-material panel, illustrating the prior art.
Figure 2:
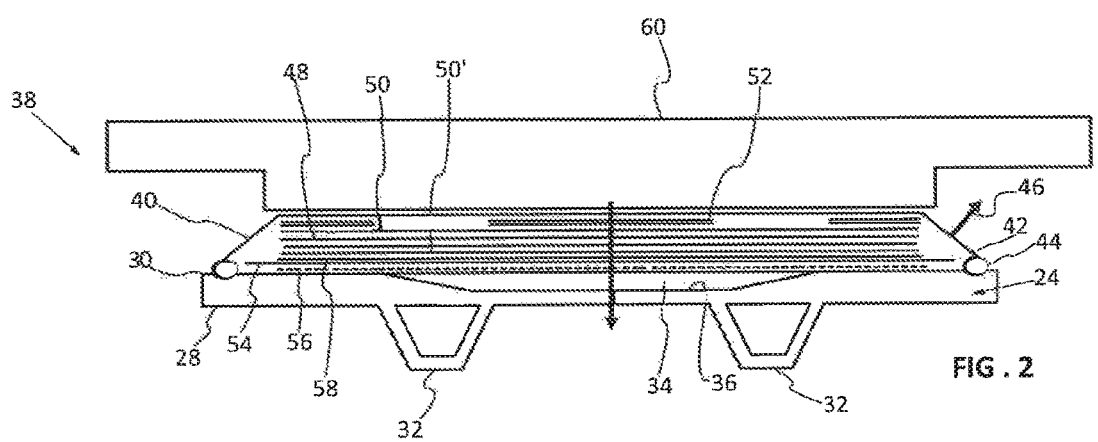
FIG. 2 is a schematic cross section of a tool for repairing a composite-material panel, illustrating the invention.
Figure 3:
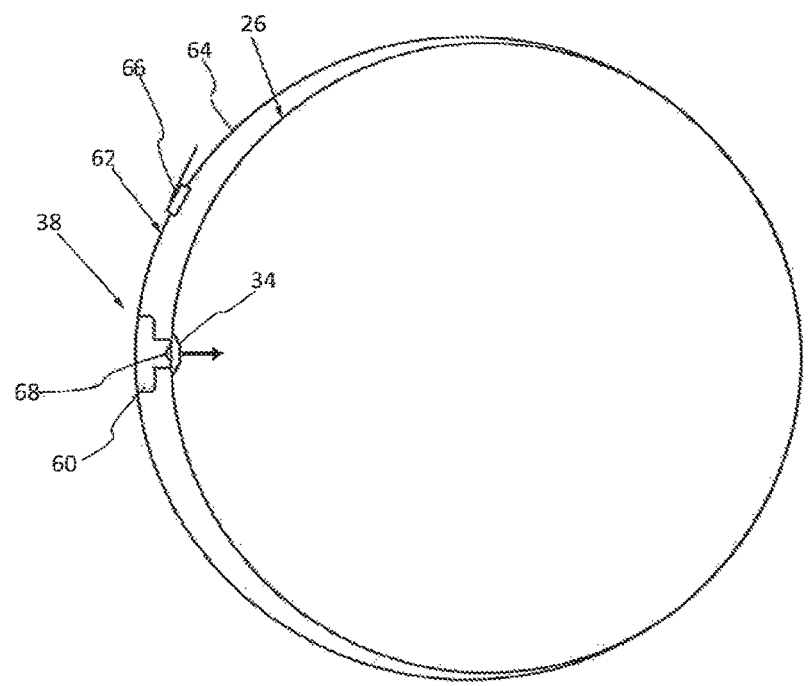
FIG. 3 is a schematic transverse cross section of a fuselage of an aircraft on which a repair tool has been positioned, illustrating a first variant of the invention.
Figure 4:
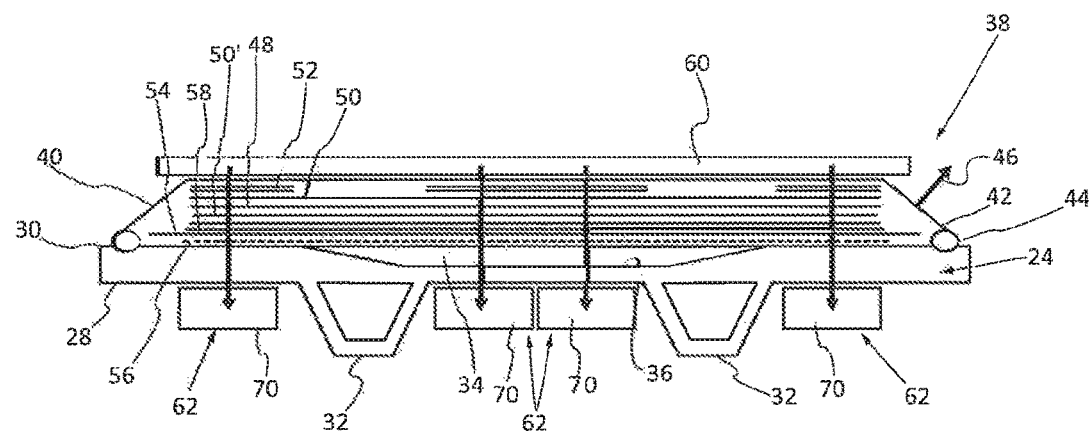
FIG. 4 is a schematic cross section of a portion of a fuselage panel of an aircraft on which a repair tool has been positioned, illustrating a second variant of the invention.
Figure 5:
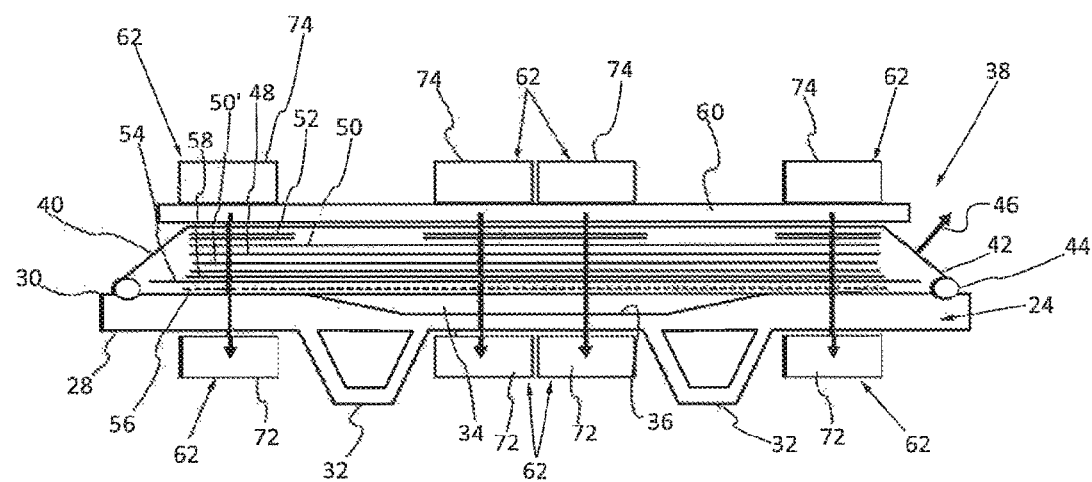
FIG. 5 is a schematic cross section of a portion of a fuselage panel of an aircraft on which a repair tool has been positioned, illustrating a third variant of the invention.

FIGS. 2, 4 and 5 show a portion of a panel 24 made of composite material. By way of example, the composite-material panel 24 is a portion of the fuselage 26 of an aircraft, as shown in FIG. 3. In a variant, the panel 24 may be a portion of the wing system or of any other part of an aircraft.

The panel 24 has a first face 28 and a second face 30.

According to one embodiment, in the case of a fuselage panel of an aircraft, the first and second faces 28 and 30 correspond respectively to the internal and external faces of the fuselage.

Advantageously, the panel is reinforced. In one embodiment, the panel has at least one stiffening member 32 on the first face 28.

The panel 24 has at least one damaged zone on the second face 30 that needs to be repaired.

The repair method includes steps in which the panel is prepared and at least one repair part 34 intended to cover the damaged zone is attached to the face of the panel with the damaged zone.

In one embodiment, during the preparation step, a recess 36 is made in the panel 24 from the second face 30, the recess 36 encompassing the damaged zone. This recess 36 may be a through-hole that opens out on both sides of the panel 24, or may be blind, as illustrated in FIGS. 2, 4 and 5.

The recess 36 is made using any appropriate means, such as by machining.

The repair part 34 is made of composite material and needs to be consolidated or polymerized.

According to one embodiment, the repair part 34 is a stack of pre-impregnated fiber plies. Naturally, the invention is not limited to this embodiment. Indeed, the fiber plies may be woven or otherwise and the fibers may be pre-impregnated or otherwise.

The shape of the repair part 34 enables same to cover at least the recess 36.

According to one embodiment, before the repair part 34 is put in place, this latter and/or the panel 24 to be repaired are coated with a resin that facilitates the bonding of the repair part 34 to the panel 24.

To polymerize or consolidate the repair part 34 and to successfully attach same to the panel 24, a tool 38 is positioned on the damaged face of the panel 24 such as to cover the repair part 34.

This tool 38 comprises:

a vacuum bag 40 that covers the repair part 34 and that has a peripheral edge 42 connected sealingly to the panel, at least one seal 44 inserted between the peripheral edge 42 of the vacuum bag 40 and the second face 30 of the panel 24, a vacuum system 46 designed to remove the gases present in the volume delimited by the vacuum bag 40 and the panel 24, a heating cover 48.

According to one embodiment, the heating cover 48 is positioned between the vacuum bag 40 and the repair part 34. Preferably, this heating cover 48 is inserted between two thin silicone plates 50, 50'.

The tool 38 may include other layers such as at least one drainage layer 52 facilitating the extraction of gases, at least one shaping plate 54, at least one perforated film 56 and at least one unperforated film 58.

According to an embodiment illustrated in FIG. 2, the tool includes, from the repair part 34 to the vacuum bag 40, an unperforated film 56, a shaping plate 54, an unperforated film 58, a thin silicone plate 50', a heating cover 48, a thin silicone plate 50 and drainage layers 52.

The vacuum bag, the seal, the vacuum system and the heating cover are not further described since they are known to the person skilled in the art.

According to one feature of the invention, the tool 38 includes a compression plate 60 designed to cover the vacuum bag 40 and at least one compression means 62 designed to act on the compression plate 60 such that the plate applies a compressive force on the repair part 34.

Thus, concomitantly with polymerizing or consolidation, the compression plate 60 compresses the repair part 34 against the panel 24, which tends to limit the appearance of faults in the repair part 34 and/or in the joining zone between the repair part 34 and the panel 24.

The compression plate 60 is a rigid element that provides a large contact surface with the vacuum bag 40. Each compression plate 60 is positioned such that the vacuum bag is positioned between the compression plate 60 and the repair part 34. Preferably, the dimensions of the compression plate 60 enable the compression plate to cover the repair part 34. According to variants, the compression plate 60 may be more or less thick. As illustrated in FIGS. 4 and 5, the compression plate 60 is relatively thinner than the compression plate 60 shown in FIG. 2, which is much thicker.

According to a first variant illustrated in FIG. 3, the compression means 62 includes at least one strap 64 that surrounds the panel 24, and a system 66 for adjusting the tension of the strap 64.

In the case of a panel 24 of the fuselage 26 of an aircraft, each strap 64 surrounds the fuselage 26. The compression plate 60 is positioned between the strap or straps 64 and the panel 24 of the fuselage and arranged to face the repair part 34. The strap 64 thereby bears against the panel itself, or against the fuselage of the aircraft, to exert a pressure on the compression plate 60.

The width of each strap is greater than 5 cm such as to distribute the pressure on the fuselage.

Preferably, the tool 38 includes at least one sensor 68 designed to measure the compressive force exerted by the compression plate 60 on the repair part 34. According to one embodiment, the sensor 68 is a pressure sensor positioned between the compression plate 60 and the vacuum bag 40.

According to another embodiment, the sensor 68 is a sensor designed to measure the tension of the straps 64 and thereby, indirectly, the compressive force applied to the repair part 34.

Advantageously, the tool 38 includes a control system designed to control the tension adjustment system 66 using information provided by the sensor 68.

The control system compares the real compressive force values determined by the sensor 68 with theoretical values and commands the tension adjustment system to reduce or increase the tension of the strap or straps 64 as a function of the comparison.

According to a second variant illustrated in FIG. 4, the compression plate 60 is made of ferromagnetic material and the compression means 62 includes at least one magnet 70 positioned against the first face of the panel 24 and designed to attract the compression plate 60 toward the panel. Preferably, the compression means 62 includes several magnets 70 positioned between the stiffening members 32 and distributed such as to exert a substantially uniform force over the entire surface of the compression plate 60.

According to a third variant illustrated in FIG. 5, the compression means 62 includes a first set of magnets 72 positioned against the first face 28 of the panel 24 and a second set of magnets 74 positioned above the compression plate 60, the magnets 74 in the second set attracted by the magnets 72 in the first set exerting a force on the compression plate 60 that tends to move the plate closer to the panel 24.

According to one embodiment, the magnets 70, 72, 74 are parallelepiped neodymium magnets with a base of around 50×50 mm.

Numerous types of magnets, in particular ferromagnetic magnets or electromagnetic magnets, of different shapes and sizes, may be used in the variants of this embodiment.

The repair method according to the invention enables reliable repairs to be achieved with an acceptable visual aspect regardless of atmospheric pressure. Consequently, this method may be used at altitude.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for repairing a composite-material panel of an aircraft, said panel having a first face and a second face that has a damaged zone, said repair method comprising the following steps:
   preparing the panel,
   placing at least one repair part made of composite material on the second face to cover the damaged zone,
   positioning a vacuum bag configured to sealingly cover the repair part,
   polymerizing or consolidating the repair part,
   strapping at least one strap around the panel in order to compress the vacuum bag against the repair part with a compression plate while polymerizing or consolidating the repair part, said compression plate being positioned between the strap or straps and the panel, and
   adjusting a tension of each strap to adjust the compressive force exerted by said compression plate on the repair part.

2. The repair method as claimed in claim 1, further including the steps of measuring the compressive force and wherein adjusting the tension of each strap as a function of the compressive force measured.

3. A method for repairing a composite-material panel of an aircraft, said panel having a first face and a second face that has a damaged zone, said repair method comprising the following steps:
   preparing the panel,
   placement of at least one repair part made of composite material on the second face to cover the damaged zone, positioning a vacuum bag configured to sealingly cover the repair part, polymerizing or consolidating the repair part, compressing said vacuum bag against the repair part using a compression plate, the compression plate being made of ferromagnetic material, and wherein at least one magnet is positioned against the first face of the panel such as to attract the compression plate toward the panel, wherein said compressing said vacuum bag against the repair part using a compression plate occurs while the repair part is polymerized or consolidated.

4. A method for repairing a composite-material panel of an aircraft, said panel having a first face and a second face that has a damaged zone, said repair method comprising the following steps:

preparing the panel, placing at least one repair part made of composite material on the second face to cover the damaged zone, positioning a vacuum bag configured to sealingly cover the repair part, polymerizing or consolidating the repair part, compressing said vacuum bag against the repair part using a compression plate, a first set of magnets being positioned against the first face of the panel, and wherein a second set of magnets is placed such that the compression plate is arranged between the first set of magnets and the second set of magnets, the magnets in the second set attracted by the magnets in the first set exerting a force on the compression plate tending to move said plate toward the panel, wherein said compressing said vacuum bag against the repair part using a compression plate occurs while the repair part is polymerized or consolidated.

5. The tool for implementing the method for repairing a panel with a repair part as claimed in claim 1, said tool comprising:

a vacuum bag configured to cover the repair part and having a peripheral edge configured to be connected sealingly to the panel, a vacuum system configured to remove the gases present in the volume delimited by the vacuum bag and the panel, a heating cover, a compression plate configured to cover the vacuum bag and at least one compression means designed to act on said compression plate such that said plate applies a compressive force on the repair part, the compression means comprising at least one strap configured to surround said panel and a system for adjusting the tension of each strap.

6. The tool as claimed in claim 5, wherein the tool has at least one sensor configured to measure a compressive force exerted by the compression plate on the repair part.

7. The tool as claimed in claim 6, wherein the tool includes a control system designed to control the tension adjustment system using information provided by the sensor.

8. The tool for implementing the method for repairing a panel with a repair part as claimed in claim 3, said tool comprising:

a vacuum bag configured to cover the repair part and having a peripheral edge configured to be connected sealingly to the panel, a vacuum system configured to remove the gases present in the volume delimited by the vacuum bag and the panel, a heating cover, a compression plate configured to cover the vacuum bag and at least one compression means configured to act on said compression plate such that said plate applies a compressive force on the repair part, the compression plate being made of ferromagnetic material, the compression means comprising at least one magnet configured to attract the compression plate toward the panel.

9. The tool for implementing the method for repairing a panel with a repair part as claimed in claim 4, said tool comprising:

a vacuum bag configured to cover the repair part and having a peripheral edge configured to be connected sealingly to the panel, a vacuum system configured to remove the gases present in the volume delimited by the vacuum bag and the panel, a heating cover, a compression plate configured to cover the vacuum bag and at least one compression means configured to act on said compression plate such that said plate applies a compressive force on the repair part, the compression means comprising a first set of magnets and a second set of magnets positioned such that the panel and the compression plate are positioned between the first and second sets of magnets and wherein the magnets in the second set are attracted by the magnets in the first set and exert a force on the compression plate tending to move said plate toward the panel.

* * * * *